Figure 1:
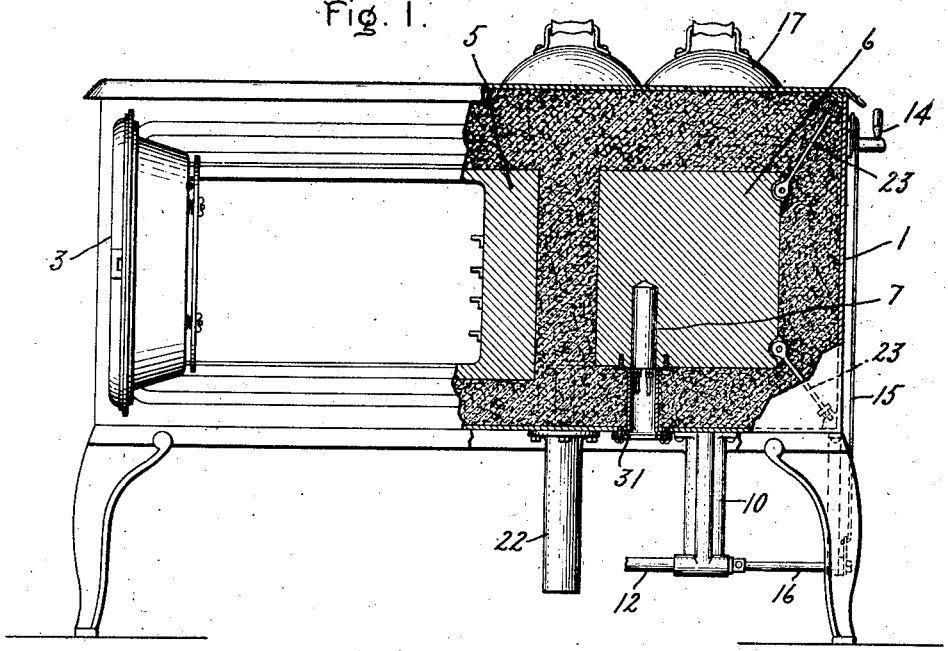

W. STANLEY.
ELECTRIC HEATER.
APPLICATION FILED FEB. 20, 1912.

1,027,291.

Patented May 21, 1912.

2 SHEETS—SHEET 1.

Witnesses:
J. Earl Ryan
J. Ellis Glen

Inventor:
William Stanley,
by
His Attorney.

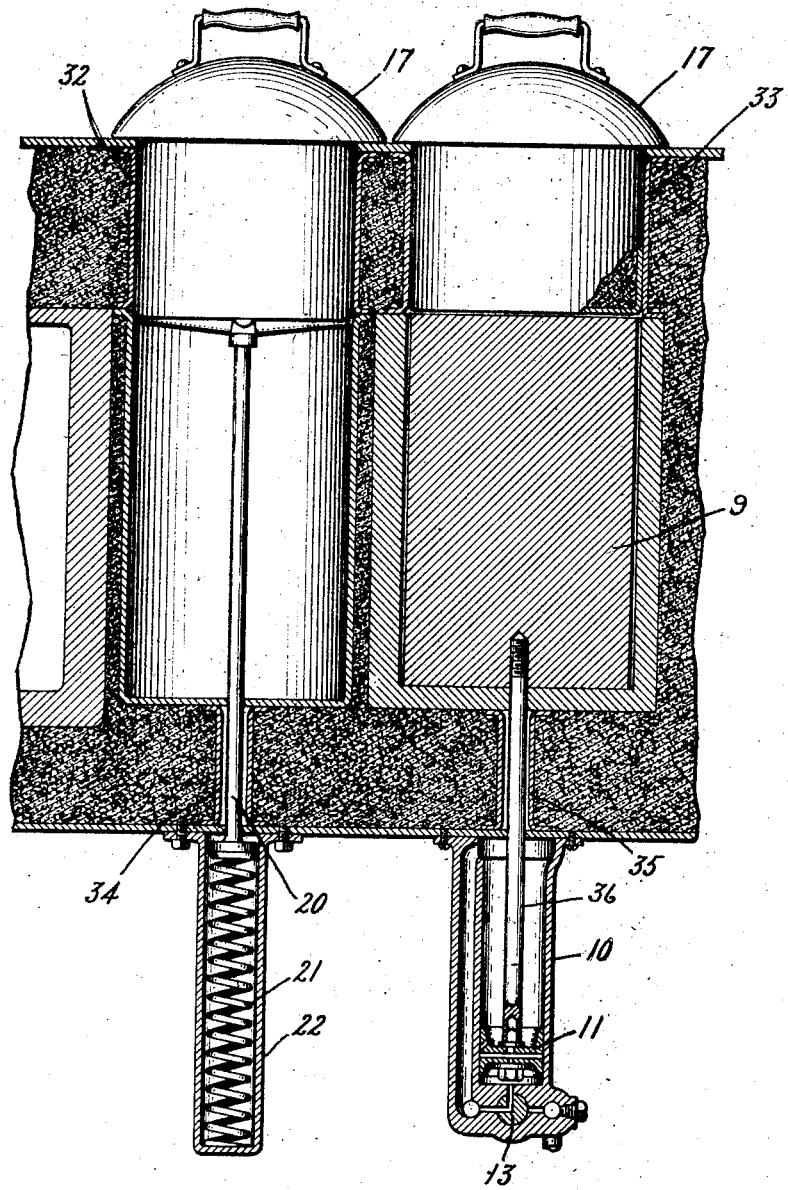

UNITED STATES PATENT OFFICE.

WILLIAM STANLEY, OF GREAT BARRINGTON, MASSACHUSETTS, ASSIGNOR TO GENERAL ELECTRIC COMPANY, A CORPORATION OF NEW YORK.

ELECTRIC HEATER.

1,027,291.  Specification of Letters Patent.  Patented May 21, 1912.

Application filed February 20, 1912. Serial No. 678,858.

*To all whom it may concern:*

Be it known that I, WILLIAM STANLEY, a citizen of the United States, residing at Great Barrington, county of Berkshire, State of Massachusetts, have invented certain new and useful Improvements in Electric Heaters, of which the following is a specification.

My invention comprises certain improvements in devices in which heat is conserved or generated.

One portion of my invention relates broadly to devices in which bodies which it is desired to thermally isolate from the surrounding atmosphere such as a receptacle for material, a means for furnishing heat to such material or both are surrounded with heat insulating means. The practicality of such devices obviously depends largely upon the effectiveness of the heat insulation for if this insulation is not effective much heat will be conducted therethrough and the efficiency of the device decreased. In the case of devices containing heat supplying means, the cost of operating the device will therefore be accordingly increased. Especially is this true in the case of heating devices such as are shown and described in my application, Serial No. 652,174, filed Sept. 30, 1911, of which the present application is in part a continuation. In such devices, heat is generated electrically and is stored in a heat insulated mass of a material the product of whose specific gravity and specific heat is high and which has, therefore, high heat storage capacity. Various heat insulated receptacles may be employed for holding matter to be heated by the said storage body. Unless good heat insulation is provided for the said storage mass and receptacles the loss involved in maintaining the storage mass at a temperature necessary for cooking operations would be sufficient to prevent the commercial use of such devices.

In general it is necessary in devices of the character under consideration to surround the heat supplying means, whether of the storage or intermittent type, and the receptacles for the matter to be heated with suitable heat insulation as, for example, lamp black, powdered silica, or asbestos. It is necessary, however, to provide various openings through this insulation to allow access to the parts inclosed thereby. In case of electrical heating devices, conduits must be provided for wires leading to the heating units. If any of the parts within the devices required to be moved by external means, openings must be provided through the insulation for the rod or other connection for producing such movement. It is obvious that, depending upon the character of the device, a greater or less number of openings must be provided. Owing to the extent to which certain openings must be used and also to the fact that in certain cases the insulation is of a character requiring a container, it is necessary to line the aforesaid openings and such lining should have comparatively high strength, hardness and stability. It is necessary also to provide braces or supports for the various inner elements of the device. It is necessary that these braces or supports have considerable strength and stability because of the stress and high temperature to which they are subjected. Not only must the linings and supports have the properties above enumerated, but they must be made of material which will not allow much loss of heat by conduction through them to the outer casing or frame and subsequent radiation to the atmosphere. The prevention of such loss or its reduction to a great extent constitutes a highly important step in the development of devices of the character referred to.

One object of my invention is to reduce the heat losses above referred to and I attain this object by the use of linings and supports composed of a metal having high specific heat resistance. I preferably employ a metal of this character which does not oxidize even at high temperatures and which may be readily rolled or drawn into the desired shape. A metal having all of these desirable properties is described in a certain Dempster Patent No. 901,428, dated October 20, 1908.

The other portion of my invention relates to heating devices and comprises means for automatically regulating the amount of heat abstracted therefrom according to the quantity of the material to be heated. The object is to reduce the amount of attention required of the operator to a minimum and to increase the economy of the said heating devices. This portion of my invention is particularly adapted for use in connection with ranges of the general type disclosed in my application, Serial No. 652,174, hereinbefore referred to. In such ranges I locate a receptacle or receptacles in such relation to the heat storage mass forming part thereof as to be normally maintained thereby at a temperature suitable for cooking certain foods. In this receptacle I provide means for supporting a cooking utensil whereby the amount of surface of the latter exposed to the heat conducted from the storage mass is automatically regulated according to the weight of material it contains. The more of a given material which is required to be cooked, the more heat will be required to raise it to a given temperature, and according to my invention this is supplied by increasing the available area of the heated surface. More particularly, according to this feature of my invention, I mount within the receptacle hereinbefore referred to a support for a cooking utensil in such a manner that it will be depressed when anything is put into the cooking utensil. This supporting means by suitable adjustment can be arranged so that the amount of depression will be proportional to the weight of the contents of the utensil, and the said contents will be exposed to an amount of heat coming from the storage mass which is also proportional to such weight. It is obvious that this portion of my invention may be used in connection with a heat supplying means of any character and is not restricted to use in connection with a storage mass.

My invention will be better understood by reference to the following description taken in connection with the accompanying drawing in which I have shown it embodied in a range of the general type disclosed in my application, Serial No. 652,174.

Figure 2:
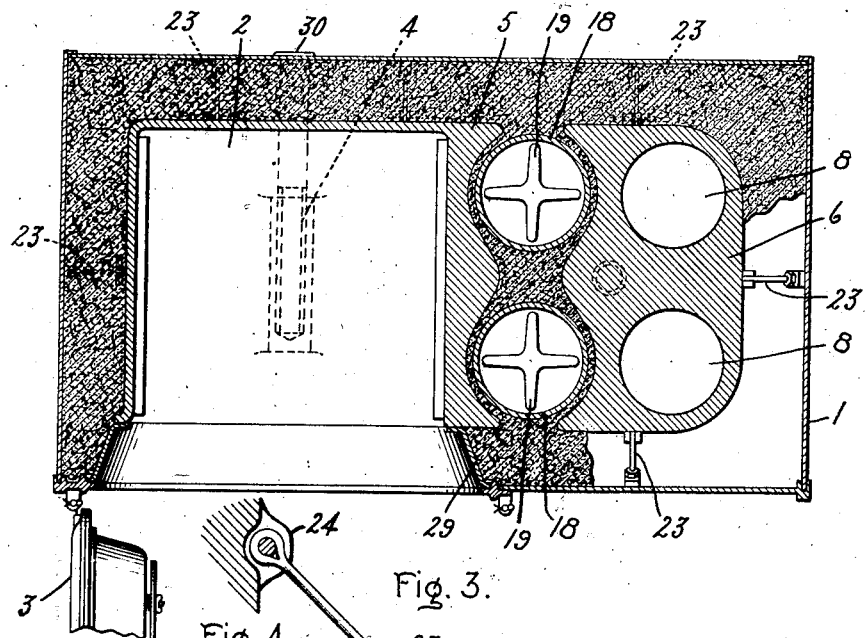
Figure 3:
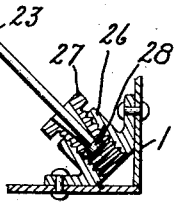
Figure 4:
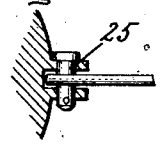

In the drawing, Figure 1 is a partial longitudinal vertical section of a range embodying my invention; Fig. 2 is a horizontal section of the same; Figs. 3 and 4 are detail sectional views showing the means of connecting the supporting rods; and Fig. 5 is a vertical section on an enlarged scale through a portion of the range showing a vegetable cooking device and one part of the heat storage mass.

The range shown in the drawing comprises the casing 1 which may be of metal or other suitable material. Within the same is supported the oven 2 provided with a door 3 and which may be heated by the electrical heating unit 4 or by the heat storage mass or by both together. The oven 2 may be constructed of cast iron or other metal the product of whose specific heat and specific gravity is high, and one wall 5 of this oven may be of considerable thickness so as to constitute a capacious heat storage mass. Within the casing 1 is also mounted what may be termed a stove or apparatus for furnishing heat as distinguished from the oven to which heat is furnished. This comprises the heat storage mass 6 which is heated by means of the electric heating unit 7. The heat storage mass 6 may have cylinders 8 formed therein and within these cylinders may be located the plungers 9 which are adapted to be raised and lowered and which are composed of material having high specific heat conductivity and the product of whose specific heat and specific gravity is high. The means shown for accomplishing this movement comprises the hydraulic cylinder 10 in which is adapted to be reciprocated the piston 11 by means of liquid supplied through the pipe 12. The flow of liquid to the cylinder 10 and therefore the movements of the piston 11 therein is controlled by means of the valve 13 which is in turn controlled by means of the handle 14 through the connecting rods 15 and 16. The covers 17 consisting of metal shells filled with insulating material are provided for the cylinders 8. Normally the heat is stored in the storage mass 6 by means of the heat unit 7. When it is desired to utilize the heat thus stored for cooking operations which require comparatively high temperature the covers 17 are removed and the plungers 9 are elevated by operating the handles 14. A cooking utensil may then be subjected to a high heat by placing it in more or less intimate relation with the top of the plunger. The specific structure of the above described parts forms no part of the present invention, the same being described and claimed in my co-pending application Serial No. 652,174.

Between the storage masses 5 and 6 are located the receptacles 18. The location of these receptacles should be such that they will be heated to a temperature proper for carrying out a particular cooking operation or operations. The length of the thermal path through the insulation at various points may be adjusted so as to secure the proper temperature. This adjustment may be secured by making the storage masses of the proper shape as shown in the drawing. Within each of these receptacles is mounted a spider 19 by means of a standard 20 extending through the bottom of the range and supported upon a spring 21 mounted in casing 22. A cover 17 which may be similar to the covers for the cylinders 8 is provided for each receptacle.

When it is desired to utilize the heat stored in the mass 5 and 6 for cooking food such as vegetables, the cover 17 may be removed from one of the receptacles 18 and a cooking utensil containing the food placed upon the spider 19. The spider 19 will be depressed against the action of the spring 21 an amount which will depend upon the weight of the contents of the cooking utensil. The more the spider is depressed the more of the surface of the cooking utensil and therefore of the contents of the same will be exposed to the heat which is conducted to the walls of the receptacle from the heat storage masses surrounding the same. Consequently the amount of heat thus supplied will be automatically proportioned to the weight of the contents of the cooking utensil.

As shown in Figs. 1 and 2 of the drawing, the oven 2 and the storage mass 6 are supported at various points by rods 23. In Figs. 3 and 4 one means for connecting these rods to the supported body and to the casing of the range is shown. A clevis may be formed by projections 24 on the supported body in which is held the rod 23 by means of the pin 25. The other end of the rod is connected to the casing 1 so that its tension may be adjusted. This result is accomplished by means of the internally threaded socket 26 which is fastened to the casing 1 and into which is adapted to extend the rod 23. The externally threaded nut 27 is adapted to be screwed into the socket 26 and to bear against the head 28 formed on the rod 23. The rods 23 are composed of metal having a high specific heat resistance. Preferably they are composed of a metal of the general character described in Dempster Patent No. 901,428, hereinbefore referred to.

In various parts of the range are provided lined openings or throats leading to the various parts contained within the same. As shown in the drawing, throat 29 is provided for the oven 2 and the throats 30, 31 are provided for the conductors leading to the heating units 4 and 7, respectively. Throats 32 and 33 are also provided in the upper portions of the receptacles 18 and the cylinders 8 respectively and in the lower part of the range throats 34 and 35 are provided for the passage of the rods 20 and 36 extending into the receptacles 18 and 8, respectively. These openings or throats are lined with a metal having a high specific heat resistance, preferably of the character disclosed in Dempster Patent No. 901,428. I also prefer to have the shells of covers 17 or at least to have the lower portions of the said shells extending into the cylinders 8, or receptacles 18 composed of a similar metal.

It is obvious that various changes may be made in the structure and arrangement of the various parts of the apparatus herein described without departing from the spirit of my invention and the scope of which is set forth in the annexed claims.

What I claim as new and desire to secure by Letters Patent of the United States, is,—

1. The combination of a receptacle, heat insulating means substantially surrounding the same, a support located outside the heat insulating means, and means composed of a metal having a high specific heat resistance connecting the said receptacle and support.

2. The combination of a receptacle, heat insulating means substantially surrounding the same and having an opening therethrough leading to the said receptacle, and a lining for said opening composed of a metal having high specific heat resistance.

3. The combination of a receptacle, heat insulating means substantially surrounding the same and having an opening therethrough leading to the said receptacle, and a cover for said opening composed substantially of metal having a high specific heat resistance.

4. The combination of a body to be thermally isolated from the surrounding atmosphere, heat insulating means substantially surrounding the same, a support located outside the heat insulating means, and means composed of a metal having a high specific heat resistance connecting said body with said support.

5. The combination of a body to be thermally isolated from the surrounding atmosphere, heat insulating means substantially surrounding the same and having an opening therethrough leading to the said body, and a lining for said opening composed of a metal having high specific heat resistance.

6. The combination of a body to be thermally isolated from the surrounding atmosphere, heat insulating means substantially surrounding the same and having an opening therethrough leading to the said body, and a cover for said opening composed substantially of metal having a high specific heat resistance.

7. A stove comprising a heat storage mass and heat insulation surrounding the same having an opening therethrough, said opening being lined with metal of high specific heat resistance.

8. A stove comprising a mass of heat insulation having an opening therein lined with metal of high specific heat resistance, and a movable heat storage mass normally located substantially at the inner end of said opening.

9. A stove comprising a mass of heat insulation having an opening therein lined with metal of high specific heat resistance, a storage mass normally located substantially at the inner end of said opening, and a heat insulating cover adapted to close said opening.

10. A heating stove comprising a mass of heat insulation having an opening therein lined with metal of high specific heat resistance, a heat storage mass of metal normally located substantially at the inner end of said opening having a movable portion, and means for moving said portion in said opening, said means extending through the insulation by an opening lined with a metal of high specific heat resistance.

11. A cooking range comprising a body of heat insulation provided with an opening for an oven, a heat storage mass embedded in said insulation, and a lining of metal of high specific heat resistance inclosing the passage to the oven through the insulation.

12. The combination with a body to be thermally isolated from the surrounding atmosphere, heat insulating material surrounding the same, a casing surrounding the said insulating material, and metallic members having a high specific heat resistance extending through the insulation to connect the said body with the casing.

13. A cooking range comprising a source of heat surrounded by heat insulation, a cooking chamber adjacent thereto, a support for the material to be heated movably located in said chamber, and means whereby said support will assume various positions within said chamber depending upon the weight of the material placed thereon.

14. A cooking range comprising a source of heat surrounded by heat insulation, a cooking chamber adjacent thereto, and a resiliently mounted support for the material to be heated located in said chamber whereby the position of the support in the chamber will depend upon the weight thereon.

15. In a heating device, a source of heat, a support for bodies to be heated normally located adjacent the upper end of said source, and means whereby a body to be heated when placed upon said support will automatically depress the said support a distance substantially proportional to its weight.

In witness whereof, I have hereunto set my hand this 17th day of February, 1912.

WILLIAM STANLEY.

Witnesses:
WILLIAM W. STANLEY,
C. P. RANDOLPH.